No. 850,769. PATENTED APR. 16, 1907.
J. MACPHAIL.
MOLD FORMING MACHINE.
APPLICATION FILED NOV. 27, 1905.

WITNESSES:
Clara Wilhelm

INVENTOR.
James MacPhail
BY Ely & Bush
ATTORNEYS

UNITED STATES PATENT OFFICE.

JAMES MACPHAIL, OF MOLINE, ILLINOIS, ASSIGNOR, BY MESNE ASSIGNMENTS, TO KILLING MOLDING MACHINE COMPANY, OF DAVENPORT, IOWA, A CORPORATION.

MOLD-FORMING MACHINE.

No. 850,769.  Specification of Letters Patent.  Patented April 16, 1907.

Application filed November 27, 1905. Serial No. 289,296.

*To all whom it may concern:*

Be it known that I, JAMES MACPHAIL, a citizen of the United States of America, residing at Moline, in the county of Rock Island and State of Illinois, have invented a new and useful Improvement in Mold-Forming Machines, of which the following is a specification.

My invention relates to mold-forming machines in which a stationary stripping-plate is employed in conjunction with a reciprocating pattern-plate; and the objects of my invention are to provide a simple easily-operated machine of low cost for forming molds and withdrawing the pattern from the molds, a machine that will allow the use of patterns of many varieties and of large size compared with the size of the machine; also to provide means for independently adjusting various parts of the machine and to give the pattern a partial rotary movement when being withdrawn from the mold. I attain these objects by the mechanism illustrated in the accompanying drawings, in which—

Figure 1:
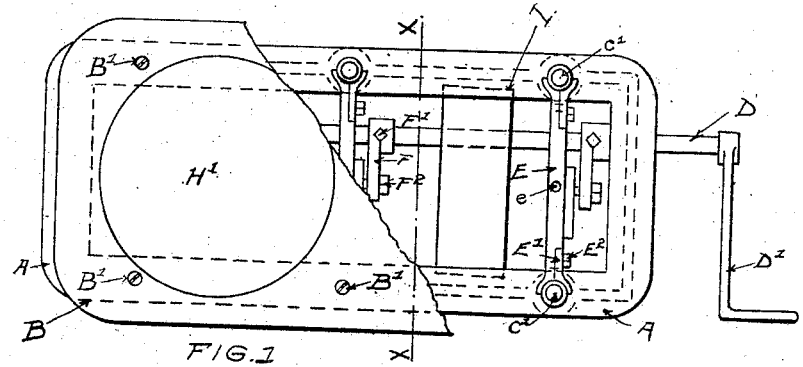
Figure 2:
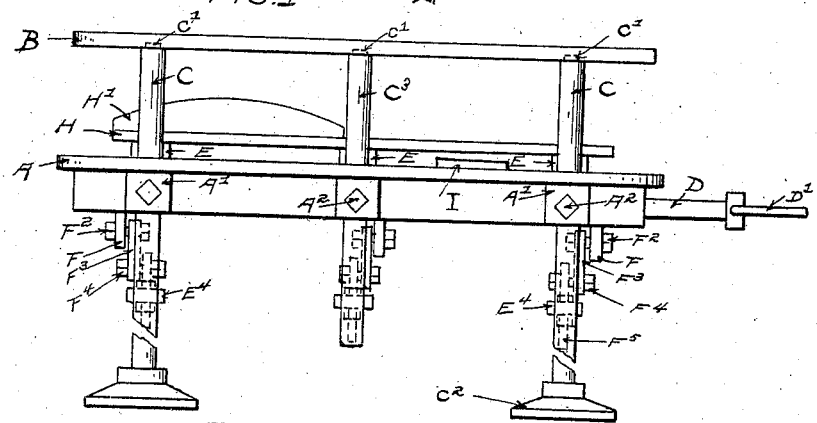
Figure 3:
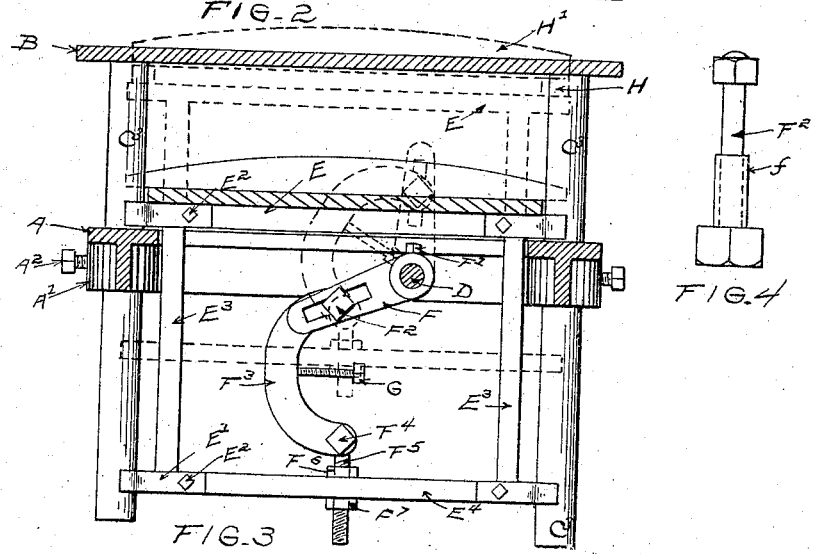
Figure 4:
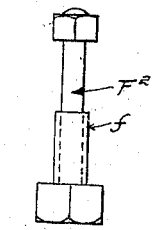

Figure 1 is a top or plan view, but with a portion of the pattern-plate and stripping-plate partly cut away and showing stool-plate. Fig. 2 is a side elevation, also showing in dotted lines the links and their connections. Fig. 3 is a cross-section on the line X X of Fig. 1, showing in solid lines the cross-head, crank-arm, and link in their lower position and in dotted lines in their upper position. Fig. 4 is a detail showing the bolt, with sleeve thereon, connecting the arm and link.

Similar letters refer to similar parts throughout the several views.

The frame A is supported by the legs C C, providing guides which also extend above the frame A. Four or more legs may be used, as desired. In the drawings the middle pair of legs $C^3$ $C^3$ is shown with the lower portion cut off, the remaining portion merely forming an extra pair of guides.

Slidingly mounted between each pair of guides are cross-heads, composed of a top bar E above the frame A, a lower bar $E^4$ below the frame A, connected by two vertical bars $E^3$ $E^3$. These cross-heads may be cast integral or in parts. In the drawings the upper bar E and lower bar $E^4$ are shown with small sections E' E', cast separately and secured by screws $E^2$ $E^2$, to afford means of taking up the wear on the legs or guides C C $C^3$ $C^3$.

A portion of the upper end of each leg or guide is turned off or reduced, leaving a raised central portion or shoulder C' C', which fits into a corresponding hole in the stripping-plate B. The stripping-plate B is further secured in place by screws B' B' passing through it and into the ends of the legs or guides C C $C^3$ $C^3$. The legs C C are provided with foot-blocks $C^2$ $C^2$.

A crank-shaft D is journaled in the frame A and provided with a crank-handle D', secured upon one end. Adjacent to each cross-head crank-arms F F F are secured to the shaft D by set-screws F' F' F'. Each crank-arm F is slotted to receive a sleeve $f$ and bolt $F^2$, which connects the crank-arm with a curved link $F^3$. The lower end of each curved link $F^3$ is secured by a pivot-bolt $F^4$ to a vertical bolt $F^5$ passing through the lower bar $E^4$ and adjustably secured thereto by lock-nuts $F^6$ and $F^7$.

A set-screw G is screwed into each curved link $F^3$, forming an adjustable stop to limit the throw of the crank-arm F, and consequently the movement of the crank-handle D'. Set-screws $A^2$ $A^2$, passing through bosses A' A' of the frame A, secure the frame A at the desired height upon the legs C C $C^3$ $C^3$. A stool-plate I is mounted upon the frame A when the work in hand requires the use of stools. A pattern H' is shown upon the pattern-plate H.

In operation the pattern-plate is set at the highest point of its travel with the pattern projecting through the stripping-plate, as shown in dotted lines in Fig. 3. A flask is then set on the stripping-plate and the mold formed in the usual manner. The pattern is then drawn from the mold by the crank-handle D', the mold removed, and the pattern returned to its first position ready to form another mold. The frame A can be set at any convenient height, and when the work in hand requires the use of stools stool-plates are secured to the frame. If desired, one end of the pattern-plate can be set higher than the other by the adjustment of the lock-nuts $F^6$ $F^7$ upon the vertical bolt $F^5$. The throw or travel of the pattern-plate can be regulated by adjusting the position of the bolts F² F² in the slots of the crank-arms F F, and the travel of either end of the pattern-plate can be made longer or shorter than the travel of the other end by the same means.

This form of machine permits the use of patterns considerably larger than the frame of the machine. The adjustable throw or travel of the pattern-plate permits the use of patterns more or less curved at the ends, as the pattern is given a partial rotary motion while being withdrawn when a longer throw is given one end of the pattern-plate than is given the other. To enable the pattern H' to be given a partial rotary motion I provide, as shown in Fig. 1, an opening e at the middle of the upper bar E of the end cross-head near where the crank-handle D' is attached. The pattern-plate H is placed loosely upon the cross-heads E and is provided with a dowel-pin to pivot it to the opening e in the cross-head E at one end, the opposite end of the pattern-plate simply resting upon the cross-head E at the other end. By this arrangement it will be possible to give a longer throw or travel to the end of the pattern-plate farthest from the crank-handle than is given to the end of the pattern-plate nearest to the crank-handle to draw a pattern upon a curved line.

It will be observed that the construction shown provides long bearings for the cross-heads, thereby securing steady motion of the cross-heads during operation.

What I claim as new, and desire to secure by Letters Patent, is—

1. A mold-forming machine comprising vertical guides, a frame supported by the guides, cross-heads having lower and upper bars and slidable on the guides, a pattern-plate carried by the cross-heads, a stripping-plate mounted upon the guides above the pattern-plate, and means for lifting and lowering the cross-heads with the pattern-plate toward and from the stripping-plate consisting of a shaft mounted in the frame, slotted crank-arms secured to the shaft, curved links pivoted to the lower bars of the cross-heads, and pivot-bolts connecting the slotted crank-arms adjustably with the curved links.

2. A mold-forming machine comprising vertical guides, a frame supported by the guides, cross-heads having lower and upper bars and slidable on the guides, a pattern-plate carried by the cross-heads, a stripping-plate mounted upon the guides above the pattern-plate and means for lifting and lowering the cross-heads with the pattern-plate toward and from the stripping-plate consisting of a shaft mounted in the frame, crank-arms secured to the shaft, curved links, vertical bolts whereby the curved arms are adjustably connected to the lower bar of the cross-heads, and pivot-bolts connecting the crank-arms with the curved links.

3. A mold-forming machine comprising vertical guides, a frame supported by the guides, cross-heads having lower and upper bars and slidable on the guides, a pattern-plate carried by the cross-heads, a stripping-plate mounted upon the guides above the pattern-plate and means for lifting and lowering the cross-heads with the pattern-plate toward and from the stripping-plate consisting of a shaft mounted in the frame, crank-arms secured to the shaft, curved links connected to the lower bar of the cross-heads, and having adjustable stops adapted to impinge against the shaft and pivot-bolts connecting the crank-arms with the curved links.

JAMES MACPHAIL.

Witnesses:
  CLARA WILHELM,
  F. A. CROUCH.